US007579032B2

(12) United States Patent
Lee et al.

(10) Patent No.: US 7,579,032 B2
(45) Date of Patent: Aug. 25, 2009

(54) USE OF ERYTHRITOL AND D-TAGATOSE IN ZERO-OR LOW-CALORIE BEVERAGES

(75) Inventors: Thomas Lee, Scarsdale, NY (US); Gino Olcese, Scarsdale, NY (US); Zena Bell, Hartsdale, NY (US); Glenn Roy, Beacon, NY (US); William Mutilangi, Croton-on-Hudson, NY (US); Rein Hirs, Mahopac, NY (US); Peter Given, Ridgfield, CT (US)

(73) Assignee: Pepsico, Inc., Purchase, NY (US)

( * ) Notice: Subject to any disclaimer, the term of this patent is extended or adjusted under 35 U.S.C. 154(b) by 197 days.

(21) Appl. No.: 10/127,455

(22) Filed: Apr. 23, 2002

(65) Prior Publication Data
US 2002/0197371 A1 Dec. 26, 2002

Related U.S. Application Data

(63) Continuation-in-part of application No. 09/845,281, filed on May 1, 2001, now abandoned.

(60) Provisional application No. 60/334,770, filed on Oct. 31, 2001, provisional application No. 60/287,215, filed on Apr. 27, 2001.

(51) Int. Cl.
*A23L 1/236* (2006.01)
(52) U.S. Cl. ............... 426/548; 426/477; 426/565; 426/569; 426/590
(58) Field of Classification Search ............... 426/548, 426/474, 477, 564, 565, 569, 590
See application file for complete search history.

(56) References Cited

U.S. PATENT DOCUMENTS

| 3,460,713 | A |   | 8/1969 | Cornelius | 222/1 |
|---|---|---|---|---|---|
| 3,619,205 | A |   | 11/1971 | Le Van et al. | 99/78 |
| 3,647,472 | A |   | 3/1972 | Speech et al. | 99/34 |
| 3,826,829 | A |   | 7/1974 | Marulich | 426/190 |
| 4,262,032 | A |   | 4/1981 | Levin | 426/658 |
| 4,452,824 | A |   | 6/1984 | Cole et al. | 426/565 |
| 4,619,833 | A |   | 10/1986 | Anderson | 426/548 |
| 4,626,441 | A |   | 12/1986 | Wolkstein | 426/548 |
| 4,748,033 | A |   | 5/1988 | Syfert et al. | 426/330.3 |
| 4,760,138 | A |   | 7/1988 | So et al. | 536/102 |
| 4,770,889 | A |   | 9/1988 | Sakai et al. | 426/548 |
| 4,786,722 | A |   | 11/1988 | Zehner | 536/1.1 |
| 4,790,999 | A |   | 12/1988 | Ashmont et al. | 426/592 |
| 4,808,428 | A |   | 2/1989 | Forsstrom et al. | 426/569 |
| 4,810,516 | A |   | 3/1989 | Kong-Chan | 426/548 |
| 4,902,525 | A | * | 2/1990 | Kondou | 426/548 |
| 4,963,382 | A |   | 10/1990 | Arena et al. | 426/548 |
| 4,971,797 | A |   | 11/1990 | Cherukuri et al. | 424/440 |
| 4,986,994 | A |   | 1/1991 | Baccus, Jr. | 426/330.3 |
| 5,002,612 | A |   | 3/1991 | Beadle et al. | 127/46.1 |
| 5,017,400 | A |   | 5/1991 | Olinger et al. | 426/660 |
| 5,041,541 | A |   | 8/1991 | Mazur | 536/11 |
| RE33,719 | E |   | 10/1991 | Levin | 426/658 |
| 5,064,672 | A |   | 11/1991 | Mazur | 426/531 |
| 5,069,924 | A |   | 12/1991 | Baccus, Jr. | 426/590 |
| 5,078,796 | A |   | 1/1992 | Beadle et al. | 127/46.1 |
| 5,103,649 | A |   | 4/1992 | Kieffer | 62/136 |
| 5,106,967 | A |   | 4/1992 | Mazur | 536/119 |
| 5,120,550 | A |   | 6/1992 | Van der Schueren | 426/3 |
| 5,226,450 | A |   | 7/1993 | Lambourn | 137/607 |
| 5,244,690 | A |   | 9/1993 | Van der Schueren et al. | 426/660 |
| 5,273,771 | A |   | 12/1993 | Rapaille et al. | 426/548 |
| 5,275,835 | A |   | 1/1994 | Masterson et al. | 426/607 |
| 5,380,541 | A |   | 1/1995 | Beyts et al. | 426/548 |
| 5,399,365 | A |   | 3/1995 | Yatka et al. | 426/3 |
| 5,468,734 | A |   | 11/1995 | Seri et al. | 514/23 |
| 5,478,587 | A |   | 12/1995 | Mingione | 426/565 |
| 5,516,763 | A |   | 5/1996 | Heikkila et al. | 514/53 |
| 5,518,754 | A |   | 5/1996 | Miller et al. | 426/611 |
| 5,527,554 | A |   | 6/1996 | Olinger et al. | 426/567 |
| 5,532,022 | A |   | 7/1996 | Miller et al. | 426/660 |
| 5,585,480 | A |   | 12/1996 | Vogel et al. | 536/123 |
| 5,665,406 | A |   | 9/1997 | Reed et al. | 426/5 |
| 5,667,573 | A |   | 9/1997 | Kondou | 106/194.2 |
| 5,672,589 | A |   | 9/1997 | Heikkila et al. | 514/53 |
| 5,700,514 | A |   | 12/1997 | Gonze et al. | 426/660 |
| 5,706,661 | A |   | 1/1998 | Frank | 62/70 |
| 5,736,185 | A |   | 4/1998 | Kohno et al. | 426/589 |
| 5,743,097 | A |   | 4/1998 | Frank | 62/68 |
| 5,806,550 | A |   | 9/1998 | Frank | 137/7 |
| 5,811,271 | A |   | 9/1998 | Izumori et al. | 435/105 |
| 5,853,785 | A |   | 12/1998 | Nayyar et al. | 426/565 |
| 5,912,030 | A | * | 6/1999 | Huzinec et al. | 426/3 |
| 5,916,606 | A |   | 6/1999 | Record et al. | 426/3 |
| 5,973,212 | A |   | 10/1999 | De Sadeleer et al. | 568/852 |
| 6,010,734 | A |   | 1/2000 | Whelan et al. | 426/565 |
| 6,045,850 | A |   | 4/2000 | Kondou | 426/548 |
| 6,048,567 | A |   | 4/2000 | Villagran et al. | 426/594 |
| 6,066,345 | A | * | 5/2000 | De Cock | 426/106 |

(Continued)

FOREIGN PATENT DOCUMENTS

CA  2 309 503  12/2000

(Continued)

OTHER PUBLICATIONS

G.R. Shore, et al., "Taste and Mouthfeel in Low Calorie Soft Drinks", Contribution of Low- and Non-Volatile Materials to Flavor, W. Pickenhagen, ed., Allured Pub. Corp., pp. 119-123 (1996).

(Continued)

*Primary Examiner*—Leslie Wong
(74) *Attorney, Agent, or Firm*—Banner & Witcoff, Ltd.

(57) ABSTRACT

A combination of one or more non-nutritive sweeteners, a sugar alcohol and D-tagatose are included in a zero- or low-calorie beverage or food product to achieve a taste substantially similar to that of a full-calorie beverage or food product. The combination is suitable for use in zero- or low-calorie frozen carbonated beverages.

20 Claims, No Drawings

U.S. PATENT DOCUMENTS

| | | | |
|---|---|---|---|
| 6,071,500 A | 6/2000 | Thistle | 424/49 |
| 6,083,527 A | 7/2000 | Thistle | 424/440 |
| 6,129,943 A | 10/2000 | Zeller et al. | 426/564 |
| 6,143,345 A | 11/2000 | Gonze et al. | 426/548 |
| 6,177,064 B1 | 1/2001 | de Troostembergh et al. | 424/49 |
| 6,189,745 B1 | 2/2001 | Frank | 222/509 |
| 6,432,464 B1 | 8/2002 | Andersen et al. | 426/548 |
| 6,456,460 B1 | 9/2002 | Connolly et al. | 360/126 |
| 6,468,576 B1 | 10/2002 | Sher et al. | 426/565 |
| 6,475,540 B1 | 11/2002 | Howling et al. | 426/94 |
| 6,749,879 B2 | 6/2004 | Broz | 426/565 |
| 2002/0001656 A1 | 1/2002 | Mason et al. | 426/565 |
| 2002/0009530 A1 | 1/2002 | DuBois et al. | 426/567 |
| 2002/0090445 A1 | 7/2002 | Alani et al. | |
| 2002/0136803 A1 | 9/2002 | Stefandl | 426/106 |
| 2002/0160090 A1 | 10/2002 | Lee et al. | 426/548 |
| 2002/0187219 A1 | 12/2002 | Yang et al. | |
| 2002/0187232 A1 | 12/2002 | Lee et al. | 426/548 |
| 2002/0197376 A1 | 12/2002 | Broz | 426/565 |

FOREIGN PATENT DOCUMENTS

| | | |
|---|---|---|
| EP | 0 009 325 | 4/1980 |
| EP | 0 236 288 | 9/1987 |
| EP | 0 257 626 | 3/1988 |
| EP | 0 287 095 A1 | 10/1988 |
| EP | 0 287 957 | 10/1988 |
| EP | 0 304 915 | 3/1989 |
| EP | 0 325 790 | 8/1989 |
| EP | 0 511 761 | 11/1992 |
| EP | 0 552 894 A2 | 7/1993 |
| EP | 0 560 284 A1 | 9/1993 |
| EP | 0 772 977 | 5/1997 |
| EP | 0 560 284 B1 | 7/1997 |
| EP | 0 941 668 | 9/1999 |
| EP | 0 965 277 | 12/1999 |
| EP | 0 966 952 | 12/1999 |
| EP | 1 048 671 | 11/2000 |
| EP | 0 709 463 B1 | 3/2001 |
| EP | 0 717 047 B1 | 5/2001 |
| EP | 0 792 589 | 10/2001 |
| EP | 1 210 880 | 6/2002 |
| EP | 0 759 273 | 7/2002 |
| FR | 2 778 822 | 11/1999 |
| GB | 2 093 677 | 9/1982 |
| JP | 59-198942 | 11/1984 |
| JP | 59-198943 | 11/1984 |
| JP | 60-2151 | 1/1985 |
| JP | 1-265852 | 10/1989 |
| JP | 3-28180 | 4/1991 |
| JP | 6-97980 | 12/1994 |
| JP | 7-4167 | 1/1995 |
| JP | 7-75524 | 3/1995 |
| JP | 7-506974 | 8/1995 |
| JP | 7-274829 | 10/1995 |
| JP | 9-224588 | 9/1997 |
| JP | 09-322744 | 12/1997 |
| JP | 10-117763 | 5/1998 |
| JP | 10-136952 | 5/1998 |
| JP | 10-136953 | 5/1998 |
| JP | 11-187819 | 7/1999 |
| JP | 11-346708 | 12/1999 |
| JP | 2000-32919 | 2/2000 |
| JP | 2000-37178 | 2/2000 |
| WO | 97/22263 | 6/1997 |
| WO | 98/16120 | 4/1998 |
| WO | 99/30577 | 6/1999 |
| WO | 99/30578 | 6/1999 |
| WO | 99/34689 | 7/1999 |
| WO | 99/43217 | 9/1999 |
| WO | 00/42865 | 7/2000 |
| WO | 01/28357 | 4/2001 |
| WO | 02/085130 | 10/2002 |
| WO | WO 02/078469 | 10/2002 |
| WO | 02/087358 | 11/2002 |
| WO | 02/087359 | 11/2002 |

OTHER PUBLICATIONS

"Blending the Taste Sensation", Liquid Foods Int'l, vol. 3, No. 1, p. 31 (1999).

H. Röper, et al., "Erythritol, a New Raw Material for Food and Non-food Applications", Starch, vol. 45, pp. 400-405 (1993).

CA Selects: Artificial Sweeteners, abstract No. 136:69093b, issue 4, p. 1 (2002).

Beck, (in "Low Calorie and Special Dietary Foods", B.K. Dwivedi, ed., CRC Press Inc., Florida, pp. 61-114 (1978)).

J.A. Van Velthuijsen, et al., "Lactitol: A New Reduced-Calorie Sweetener", Alternative Sweeteners, 2d ed., L.O'B Nabors and R.C. Gelardi, eds., Marcel Dekker, Inc., New York, pp. 283-298 (1991).

J. G ossens, et al., "Nutritive Properties and Applications of Erythritol: A Unique Combination", Advanced in Sweeteners, T.H. Grenby, ed., Blackie Academic and Professional, L ndon, pp. 150-186 (1996).

Masaharu Sakashita, Characteristics and Applications of Novel Sugar D-Tagatose, Monthly Food Chemical, Jul. 1999, 48-52, Food Chemical News Co. Ltd., Tokyo, Japan.

Fusao Orihara, Fermented Glucose Sweetener "Erythritol", Beverage Japan, Nov. 1996 Issue, No. 179, 68-69, Beverage Japan, Inc., Tokyo, Japan.

News Highlights, Beverage Japan, 2001, 4th Issue, 19, Beverage Japan, Inc., Tokyo, Japan.

News Highlights, Beverage Japan, July 1996 Issue, 5 & 11, Beverage Japan, Inc., Tokyo, Japan.

A. Krutoshnikova and M. Uger, Sweeteners in Food Industry, Moscow, Agropromizdat, 1988, pp. 5-6.

Commissioner for Patents, Office Action dated Mar. 24, 2005, prosecution history of U.S. Appl. No. 09/838,809, filed Mar. 24, 2005, pp. 1-11, USPTO, Alexandria, VA.

DuBois et al., Amendment and Reply to Office Action, Feb. 22, 2005, prosecution history of U.S. Appl. No. 09/838,809, filed Feb. 22, 2005, pp. 1-12, USPTO, Alexandria, VA.

Commissioner for Patents, Office Action dated Aug. 19, 2004, prosecution history of U.S. Appl. No. 09/838,809, filed Aug. 19, 2004, pp. 1-10, USPTO, Alexandria, VA.

DuBois et al., Amendment dated Jul. 19, 2004, prosecution history of U.S. Appl. No. 09/838,809, filed Jul. 19, 2004, pp. 1-11, USPTO, Alexandria, VA.

Commissioner for Patents, Office Action dated Mar. 5, 2004, prosecution history of U.S. Appl. No. 09/838,809, filed Mar. 5, 2004, pp. 1-8, USPTO, Alexandria, VA.

DuBois et al., Amendment Under 35 U.S.C. Sec. 1.116, Feb. 19, 2004, prosecution history of U.S. Appln. No. 09/838,809, Feb. 19, 2004, pp. 1-17, USPTO, Washington, D.C.

* cited by examiner

USE OF ERYTHRITOL AND D-TAGATOSE IN ZERO- OR LOW-CALORIE BEVERAGES

This application is a continuation-in-part of U.S. application Ser. No. 09/845,281, filed May 1, 2001, now abandoned and claims the benefit of U.S. Provisional Application Nos. 60/287,215 and 60/334,770, filed Apr. 27, 2001, and Oct. 31, 2001, respectively The disclosures of U.S. application Ser. No. 09/845,281 and U.S. Provisional Application No. 60/334, 770 are incorporated by reference herein.

BACKGROUND OF THE INVENTION

1. Field of the Invention

This invention relates to the use of a combination of a sugar alcohol and D-tagatose in a variety of zero- or low-calorie beverages and food products. This invention particularly relates to a method of improving the taste of zero- or low-calorie beverages and food products, i.e., achieving a taste similar to that of a full-calorie beverage or food product, by including a blend of non-nutritive sweeteners, a sugar alcohol and D-tagatose in a zero- or low-calorie beverage or food product. This invention also particularly relates to the use of a combination of a sugar alcohol and D-tagatose to achieve a high quality zero- or low-calorie frozen carbonated beverage. This invention further relates to beverages and food products which include both a sugar alcohol and D-tagatose.

2. Related Background Art

Zero- or low-calorie beverages and food products are very popular. Such diet products typically contain, singularly or in blends, non-nutritive sweeteners such as aspartame, acesulfame-K, saccharin, sucralose and cyclamate. While consumers do not have to worry about calories, non-nutritive sweeteners are known to impart a taste different from that of full-calorie counterparts. So-called "diet taste" is commonly described as slow onset but lingering sweetness accompanied with a bitter and/or metallic undesirable aftertaste and a watery mouthfeel. Due to the greatly reduced sugar solid content, diet drinks also lack the body and/or thickness perception associated with full-calorie drinks. G. R. Shore, et al., "Taste and Mouthfeel in Low Calorie Soft Drinks", *Contribution of Low- and Non-Volatile Materials to the Flavor of Foods*, W. Pickenhagen, ed., Allured Publishing Corp., pp. 119-123 (1996).

Zero- or low-calorie beverages and food products with tastes similar to those of full-calorie products are very desirable and have been sought after for quite some time. Currently, however, methods of improving taste have fallen short of achieving a taste similar to full-calorie products.

One option is to blend non-nutritive sweeteners. Many blends (e.g., aspartame and acesulfame-K) impart a higher degree of sweetness than individual sweeteners on an equal concentration basis. This synergistic effect results in sparing the amount of sweetener used in a given application and is therefore referred to as quantitative synergy. Blending also causes another kind of synergy, referred to as qualitative synergy, because the taste quality of the blend often is more rounded and of less bitter/metallic off-taste.

The beverage industry has taken advantage of these synergies and marketed many diet colas containing sweetener blends. "Blending the Taste Sensation", Liquid Foods Int'l., vol. 3, no. 1, p. 31 (1999). For example, PepsiONE® (aspartame/acesulfame-K), Coke Light® (aspartame/acesulfame-K or sodium cyclamate/acesulfame-K/aspartame) and Diet Rite Cola® (sucralose/acesulfame-K) all contain sweetener blends. Sweetener blending can also enhance the shelf-life of diet cola, especially in cases where aspartame is used as a key sweetener. For example, most soda fountain diet colas in the United States contain aspartame, acesulfame-K, and sodium saccharin. When aspartame degrades, the other two stable sweeteners maintain a certain degree of sweet taste.

Another option is to include flavor enhancing additives. A myriad of such flavor enhancing additives have been identified to date. U.S. Pat. Nos. 4,902,525 and 6,066,345, JPA 7-274829 and EP 0 759 273 relate to the addition of erythritol to beverages for purposes of flavor enhancement. Additionally, D-tagatose is known to produce improved flavor and mouthfeel at low doses with combinations of intense sweeteners.

Efforts in the beverage industry in the United States and abroad have produced taste-improved diet products. To date, however, there is simply no effective method of significantly improving the taste of zero- or low-calorie beverages and food products, i.e., achieving a taste similar or identical to that of full-calorie beverages and food products.

In addition, further problems arise when attempting to achieve zero- or low-calorie frozen carbonated beverages (FCBs), which are semi-frozen carbonated drinks dispensed from a FCB dispenser. Such beverages require bulk solutes to stabilize small ice crystals and to trap carbon dioxide for a good taste and a smooth texture. The most commonly employed bulk solute is sugar. However, sugar is caloric and is therefore not suitable for the formulation of zero- or low-calorie FCBs. Sugar alcohols, which are known to mimic the bulk properties of ordinary sugars and have fewer calories, also are less sweet and most have undesirable gastrointestinal effects when ingested at comparable levels to sugars. Thus, making diet FCBs has been very difficult due to the need for both bulk solutes and zero or low calories.

SUMMARY OF THE INVENTION

This invention is directed to a method of improving the taste of a diet beverage comprising the step of including in the diet beverage (a) at least one and preferably a blend of non-nutritive sweeteners, (b) a sugar alcohol and (c) D-tagatose. According to certain preferred embodiments of the present invention, the beverage is a soft drink such as a cola or lemon-lime soft drink, a fountain beverage, a frozen ready-to-drink beverage, a coffee beverage, a tea beverage, a powdered soft drink, a liquid concentrate, a flavored water, enhanced water, a fruit juice or a fruit juice flavored drink, a sport drink or an alcoholic drink.

The present invention is also directed to a method of improving the taste of a diet food product comprising the step of including in the diet food product (a) at least one and preferably a blend of non-nutritive sweeteners, (b) a sugar alcohol and (c) D-tagatose. According to certain preferred embodiments of the present invention, the food product is a confection, dairy product, gelatin, pudding, cake mix, cereal or cereal-based product or baked good.

This invention is further directed to a method of making a diet frozen carbonated beverage comprising the step of combining (a) at least one and preferably a blend of non-nutritive sweeteners, (b) a sugar alcohol and (c) D-tagatose. Additionally, the invention is directed to a diet frozen carbonated beverage comprising (a) at least one and preferably a blend of non-nutritive sweeteners, (b) a sugar alcohol and (c) D-tagatose.

According to certain preferred embodiments of the present invention, the non-nutritive sweeteners are selected from aspartame, acesulfame salts, saccharins, cyclamates, sucralose, alitame, neotame, steviosides, glycyrrhizin, Lo Han Guo, neohesperidin dihydrochalcone, monatin, monellin, thaumatin, and brazzein, and the sugar alcohol is selected from sorbitol, mannitol, lactitol, maltitol, xylitol, erythritol and combinations thereof.

The present invention is also directed to diet beverages and food products which include (a) at least one and preferably a blend of non-nutritive sweeteners, (b) a sugar alcohol and (c) D-tagatose.

DETAILED DESCRIPTION

As used herein, "taste" refers to a combination of sweetness perception, temporal effects of sweetness perception, i.e., on-set and duration, off-tastes, e.g., bitterness and metallic taste, residual perception (aftertaste) and tactile perception, e.g., body and thickness. As used herein, "zero-calorie" means having less than 5 calories per serving, e.g., per 8 oz. for beverages. As used herein, "low-calorie" means having less than or equal to 40 calories per serving, e.g., per 8 oz. for beverages. As used herein, "diet" refers to either "zero-calorie" or "low-calorie". What is more, "reduced calorie" means having a reduced number of calories as compared with a full-calorie counterpart; more particularly, "reduced calorie" typically means having at least a 25% reduction in calories per serving, e.g., per 8 oz. for beverages.

The present invention is first directed to a method of improving the taste of diet beverages and food products. According to the present invention, it is possible to achieve a diet beverage or food product with a taste that is substantially similar or identical to that of a full-calorie beverage or food product. As a result of the present inventive method and, in particular, the combination of sweetener or sweetener blend, sugar alcohol and D-tagatose, overall sweetness, aftertaste duration, mouthfeel and sucrose-like quality of diet foods and beverages are unexpectedly and advantageously improved.

According to the first embodiment of the present invention, the taste of a diet beverage is improved by including in the beverage (a) at least one non-nutritive sweetener, (b) a sugar alcohol and (c) D-tagatose. Beverages include, without limitation, carbonated soft drinks, fountain beverages, frozen ready-to-drink beverages, coffee beverages, tea beverages, powdered soft drinks, as well as liquid concentrates, flavored waters, enhanced waters, fruit juice and fruit juice flavored drinks, sport drinks and alcoholic products. The beverage may be carbonated or noncarbonated. In a preferred embodiment of the present invention, the beverage is a carbonated cola-flavored soft drink or a frozen carbonated beverage (FCB).

While it is believed that the combination of a single non-nutritive sweetener, a sugar alcohol and D-tagatose would lead to improved taste, it is also believed that the improvement is much more pronounced when using a blend of non-nutritive sweeteners. Therefore, a preferred embodiment of the present invention is directed to a method in which a blend of non-nutritive sweeteners is employed. The blend of non-nutritive sweeteners lends qualitative synergy to the taste of a low-calorie beverage in which it is included. Any blend of non-nutritive sweeteners can be employed in the present invention; two-, three-, four- and five-way blends of non-nutritive sweeteners are preferred.

Non-nutritive sweeteners suitable for use in the present invention include, without limitation, aspartame, acesulfame salts such as acesulfame-K, saccharins (e.g., sodium and calcium salts), cyclamates (e.g., sodium and calcium salts), sucralose, alitame, neotame, steviosides, glycyrrhizin, Lo Han Guo, neohesperidin dihydrochalcone, monatin, and protein sweeteners such as thaumatin, monellin and brazzein.

Any natural or artificial non-nutritive sweetener can be employed for present purposes. As used herein, a "non-nutritive" sweetener is one which does not provide significant caloric content in typical usage amounts, i.e., less than about 1 calorie per serving (8 oz. for beverages).

Preferred two-way blends include aspartame/acesulfame-K, sodium saccharin/sodium cyclamate and sucralose/acesulfame-K. Preferred three-way blends include aspartame/acesulfame-K/sodium saccharin, aspartame/acesulfame-K/sucralose, aspartame/acesulfame-K/sodium cyclamate, aspartame/sodium saccharin/sucralose, sucralose/sodium saccharin/sodium cyclamate and acesulfame-K/sodium cyclamate/sucralose. Preferred four-way blends include aspartame/acesulfame-K/sodium saccharin/sodium cyclamate, acesulfame-K/sodium saccharin/sodium cyclamate/sucralose, aspartame/acesulfame-K/sodium cyclamate/sucralose and aspartame/acesulfame-K/sodium saccharin/sucralose. Preferred five-way blends include aspartatme/acesulfame-K/sodium saccharin/sodium cyclamate/sucralose.

One of ordinary skill in this art will readily appreciate that non-nutritive sweeteners may be combined in various ratios to form a non-nutritive sweetener blend suitable for use in the present invention. Precise ratios of non-nutritive sweeteners depend on the combination of sweeteners used in a given blend and the desired overall sweetness for a given application. Appropriate ratios can be readily determined by one of ordinary skill in this art.

One of ordinary skill in this art will also readily appreciate that the amount of the blend of non-nutritive sweeteners in a finished beverage will vary depending on a variety of factors such as the desired overall sweetness for a given application. Appropriate amounts can be readily determined by one of ordinary skill in this art.

In addition to the non-nutritive sweetener or sweetener blend, a sugar alcohol is included in a diet beverage in order to improve the overall taste. The use of a sugar alcohol blocks the lingering sweetness and the bitter/metallic aftertaste associated with the use of non-nutritive sweeteners. Sugar alcohols suitable for use in the present invention include, without limitation, sorbitol, mannitol, lactitol, maltitol, xylitol, erythritol and combinations thereof. Typically, the sugar alcohol is included in an amount from about 0.1% to 3.5% of the finished beverage by weight. Erythritol, i.e., meso-erythritol, is especially preferred for use in the present invention. Typically, erythritol is included in an amount from about 0.1% to 3.5% of the finished beverage by weight, preferably from about 0.2% to 2.5% of the finished beverage by weight.

D-tagatose is also included in the diet beverage in order to improve the overall taste. The use of D-tagatose enhances mouthfeel (also referred to as body, thickness or delocalization of sweetness). D-tagatose is included in an amount from about 0.1% to 1.0% of the finished beverage by weight, preferably 0.2% to 0.9% of the finished beverage by weight, and most preferably 0.3% to 0.6% of the finished beverage by weight.

The non-nutritive sweetener or sweetener blend provides no appreciative caloric content to a diet beverage. Based on the use level of both the sugar alcohol and the D-tagatose in the present invention, use of these ingredients does not have a significant impact on the total caloric content of a beverage sweetened as set forth in the present invention. For example, erythritol, a 4-carbon sugar alcohol, which can be obtained from Cerestar (Hammond, Ind.), is reported to generate almost no calories (0.2 calorie/g). D-tagatose, which can be obtained from Arla Foods (Union, N.J.), is reported to impart about 1.5 calories/g. It should be noted that both erythritol and D-tagatose do impart a certain degree of sweetness to the overall beverage.

Another embodiment of the present invention is directed to improving the taste of a diet food product by including in the food product (a) at least one non-nutritive sweetener, (b) a sugar alcohol and (c) D-tagatose. Again, a preferred embodiment contemplates the use of a blend of non-nutritive sweeteners. Such food products include, without limitation, confections, dairy products, gelatins, puddings, cake mixes, cereals and cereal-based products and baked goods. In a preferred embodiment of the present invention, the food product is a gelatin dessert. All of the above discussion related to the inclusion of a non-nutritive sweetener blend, sugar alcohol and D-tagatose in a diet beverage is applicable to diet food products.

Additional embodiments of the present invention are directed to diet beverages and food products which include (a) at least one and preferably a blend of non-nutritive sweeteners, (b) a sugar alcohol and (c) D-tagatose as set forth above. A preferred embodiment is directed to a diet frozen carbonated beverage (FCB). Yet another embodiment is directed to a method of making such a FCB.

Another embodiment of the present invention is directed to a sweetener composition comprising (a) at least one and preferably a blend of non-nutritive sweeteners, (b) a sugar alcohol and (c) D-tagatose as set forth above.

It is possible to include any other ingredients typically used in diet beverages and food products in appropriate amounts in the diet beverages and food products of the present invention. For example, in the diet frozen carbonated beverages of the present invention, it is possible to include other ingredients typically found in such beverages. Such other ingredients include, without limitation, acidulants, flavors, soluble low-calorie fibers such as polydextrose, Fibersol®, or arabinogalactan, chitosan, chitin, xanthan, pectin, cellulosics, konjac, gum arabic, modified starch, soy fiber, inulin, inulose, hydrolyzed guar, guar gum, beta-glucan, carageenan, locust bean gum, alginate, polyglycol alginate, foam stabilizing agents such as yucca or yucca/quillaia extracts, salts such as sodium, calcium and potassium chlorides, food grade surfactants such as monoglycerides, diglycerides, lecithin and fractions thereof, and synthetic surfactants such as Tweens®, Spans®, diacetyltartaric esters, citric acid esters, etc.

It is additionally possible to include in a beverage or food product, a combination of at least one non-nutritive sweetener, a sugar alcohol, D-tagatose and at least one nutritive sweetener in order to achieve good tasting, diet or reduced calorie beverages or food products. Any nutritive sweetener is suitable for use; as used herein, a "nutritive" sweetener is one which provides significant caloric content in typical usage amounts, i.e., more than about 1 calorie per serving (8 oz. for beverages). Such sweeteners include, without limitation, fructose, sucrose, dextrose, maltose, trehalose, rhamnose, corn syrups and fructo-oligosaccharides. All of the above discussion related to the inclusion of a non-nutritive sweetener blend, sugar alcohol and D-tagatose in a diet beverage is applicable to reduced calorie products.

The examples which follow are intended as an illustration of certain preferred embodiments of the invention, and no limitation of the invention is implied.

EXAMPLE 1

A 2-liter syrup for use in making a finished cola drink was prepared. The ingredients listed in Table 1 were added in sequence to approximately 1-1.5 L purified water with stirring.

TABLE 1

| ingredient | (g) |
| --- | --- |
| sodium benzoate | 2.04 |
| phosphoric acid | 4.41 |
| caffeine | 1.27 |
| citric acid | 1.63 |
| cola flavors | 38.63 |
| aspartame | 1.63 |
| acesulfame-K | 0.528 |
| sodium saccharin | 0.42 |
| sodium cyclamate | 4.2 |
| erythritol | 24.0 |
| D-tagatose | 48.0 |

Purified water was added until the syrup was 2 liters in volume. Then, 50 mL portions of the syrup were added respectively to 250 mL portions of carbonated water, i.e., a five-plus-one "throw", to obtain finished cola drinks. The drinks were sealed, shaken several times and aged in a temperature-controlled (90° F.) room. Drinks were pulled at regular intervals and evaluated by a panel of experts in cola taste. Drinks made according to this example were judged as providing a taste extremely close to that of a regular or full-calorie cola drink control.

EXAMPLE 2

A 2-liter syrup for use in making a finished cola drink was prepared. The ingredients listed in Table 2 were added in sequence to approximately 1-1.5 L purified water with stirring.

TABLE 2

| ingredient | (g) |
| --- | --- |
| sodium benzoate | 2.04 |
| phosphoric acid | 4.41 |
| caffeine | 1.27 |
| citric acid | 1.63 |
| cola flavors | 38.63 |
| aspartame | 2.72 |
| acesulfame-K | 0.66 |
| sodium saccharin | 0.468 |
| erytbritol | 26.4 |
| D-tagatose | 52.8 |

Purified water was added until the syrup was 2 liters in volume. Then, 50 mL portions of the syrup were added respectively to 250 mL portions of carbonated water, i.e., a five-plus-one "throw", to obtain finished cola drinks. The drinks were sealed, shaken several times and aged in a temperature-controlled (90° F.) room. Drinks were pulled at regular intervals and evaluated by a panel of experts in cola taste.

Drinks made according to this example were judged as providing a taste extremely close to that of a regular or full-calorie cola drink control.

EXAMPLE 3

A 2-liter syrup for use in making a finished cola drink was prepared. The ingredients listed in Table 3 were added in sequence to approximately 1-1.5 L purified water with stirring.

TABLE 3

| ingredient | (g) |
|---|---|
| sodium benzoate | 2.04 |
| phosphoric acid | 4.41 |
| caffeine | 1.27 |
| citric acid | 1.63 |
| cola flavors | 38.63 |
| acesulfame-K | 1.836 |
| sodium cyclamate | 4.488 |
| sodium saccharin | 0.912 |
| sucralose | 0.516 |
| erythritol | 24.0 |
| D-tagatose | 48.0 |

Purified water was added until the syrup was 2 liters in volume. Then, 50 mL portions of the syrup were added respectively to 250 mL portions of carbonated water, i.e., a five-plus-one "throw", to obtain finished cola drinks. The drinks were sealed, shaken several times and aged at room temperature for 4 weeks. Drinks were evaluated by trained panelists. Drinks made according to this example exhibited no statistical differences as compared to a full-calorie cola with respect to sweetness, mouthfeel and cola flavor.

EXAMPLE 4

Cola drinks were prepared in the same manner as in Example 1 except insofar as a five-way blend of aspartame/acesulfame-K/sodium saccharin/sodium cyclamate/sucralose was used. Sodium saccharin was included in an amount from 30-40 ppm, e.g., 35 ppm, in the finished cola drinks. The ratio of aspartame/acesulfame-K/sodium saccharin/sodium cyclamate/sucralose, with the amount of sodium saccharin being one, was 2.50-3.0:1.0-1.5:1:4.0-8.0:0.3-0.8. Drinks made according to this example were judged as providing a taste extremely close to that of a regular or full-calorie cola drink control.

EXAMPLE 5

Cola drinks were prepared in the same manner as in Example 1 except insofar as a four-way blend of aspartame/acesulfame-K/sodium saccharin/sodium cyclamate was used. Sodium saccharin was included in an amount from 30-40 ppm, e.g., 35 ppm, in the finished cola drinks. The ratio of aspartame/acesulfame-K/sodium saccharin/sodium cyclamate, with the amount of sodium saccharin being one, was 3.25-4.25:1.00-1.50:1:8-11. Drinks made according to this example were judged as providing a taste extremely close to that of a regular or fall-calorie cola drink control.

EXAMPLE 6

Cola drinks were prepared in the same manner as in Example 1 except insofar as a four-way blend of acesulfame-K/sodium saccharin/sodium cyclamate/sucralose was used. Sodium saccharin was included in an amount from 70-80 ppm, e.g., 75 ppm, in the finished cola drinks. The ratio of acesulfame-K/sodium saccharin/sodium cyclamate/sucralose, with the amount of sodium saccharin being one, was 1.5-2.5:1:4.0-6.0:0.4-0.8. Drinks made according to this example were judged as providing a taste extremely close to that of a regular or full-calorie cola drink control.

EXAMPLE 7

Cola drinks were prepared in the same manner as in Example 1 except insofar as a four-way blend of aspartame/acesulfame-K/sodium saccharin/sucralose was used. Sodium saccharin was included in an amount from 25-45 ppm, e.g., 35 ppm, in the finished cola drinks. The ratio of aspartame/acesulfame-K/sodium saccharin/sucralose, with the amount of sodium saccharin being one, was 3.7-4.1:1.2-1.7:1:0.4-0.8. Drinks made according to this example were judged as providing a taste extremely close to that of a regular or full-calorie cola drink control.

EXAMPLE 8

Cola drinks were prepared in the same manner as in Example 1 except insofar as a three-way blend of aspartame/acesulfame-K/sodium saccharin was used. Sodium saccharin was included in an amount from 35-45 ppm, e.g., 40 ppm, in the finished cola drinks. The ratio of aspartame/acesulfame-K/sodium saccharin, with the amount of sodium saccharin being one, was 5.25-6.05:1.25-1.55:1. Drinks made according to this example were judged as providing a taste extremely close to that of a regular or full-calorie cola drink control.

EXAMPLE 9

Cola drinks were prepared in the same manner as in Example 1 except insofar as a three-way blend of aspartame/acesulfame-K/sucralose was used. Sucralose was included in an amount from 45-55 ppm, e.g., 50 ppm, in the finished cola drinks. The ratio of aspartame/acesulfame-K/sucralose, with the amount of sucralose being one, was 1.8-2.8:1.2-1.5:1. Drinks made according to this example were judged as providing a taste extremely close to that of a regular or full-calorie cola drink control.

EXAMPLE 10

Cola drinks were prepared in the same manner as in Example 1 except insofar as a three-way blend of aspartame/acesulfame-K/sodium cyclamate was used. Acesulfame-K was included in an amount from 40-70 ppm, e.g., 55 ppm, in the finished cola drinks. The ratio of aspartame/acesulfame-K/sodium cyclamate, with the amount of acesulfame-K being one, was 3.5-4.5:1:6.0-8.0. Drinks made according to this example were judged as providing a taste extremely close to that of a regular or full-calorie cola drink control.

EXAMPLE 11

Cola drinks were prepared in the same manner as in Example 1 except insofar as a three-way blend of acesulfame-K/sodium saccharin/sucralose was used. Sodium saccharin was included in an amount from 35-75 ppm, e.g., 40 ppm, in the finished cola drinks. The ratio of acesulfame-K/sodium saccharin/sucralose, with the amount of sodium saccharin being one, was 1.0-2.5:1:1.5-2.5. Drinks made according to this example were judged as providing a taste extremely close to that of a regular or full-calorie cola drink control.

EXAMPLE 12

Cola drinks were prepared in the same manner as in Example 1 except insofar as a three-way blend of acesulfame-K/sodium saccharin/sodium cyclamate was used. Sodium saccharin was included in an amount from 45-60 ppm, e.g., 55 ppm, in the finished cola drinks. The ratio of acesulfame-K/sodium saccharin/sodium cyclamate, with the amount of sodium saccharin being one, was 1.5-2.5:1:6.0-8.0. Drinks made according to this example were judged as providing a taste extremely close to that of a regular or full-calorie cola drink control.

EXAMPLE 13

Cola drinks were prepared in the same manner as in Example 1 except insofar as a two-way blend of aspartame/acesulfame-K was used. Aspartame was included in an amount of about 300 ppm, while acesulfame-K was included in an amount of about 95 ppm in the finished cola drinks. Drinks made according to this example were judged as providing a taste extremely close to that of a regular or full-calorie cola drink control.

EXAMPLE 14

Cola drinks were prepared in the same manner as in Example 1 except insofar as a two-way blend of sodium saccharin/sodium cyclamate was used. Sodium saccharin and sodium cyclamate were included in a ratio of about 1:10 in the finished cola drinks. Drinks made according to this example were judged as providing a taste extremely close to that of a regular or full-calorie cola drink control.

EXAMPLE 15

Cola drinks were prepared in the same manner as in Example 1 except insofar as a two-way blend of sucralose/acesulfame-K was used. Sucralose was included in an amount of about 160 ppm, while acesulfame-K was included in an amount of about 122 ppm in the finished cola drinks. Drinks made according to this example were judged as providing a taste extremely close to that of a regular or full-calorie cola drink control.

COMPARATIVE EXAMPLES 1A-1C

Cola drinks were prepared in the same manner as in Example 1, except insofar as erythritol (1A), D-tagatose (1B), and both erythritol and D-tagatose (1C) were omitted, respectively. Drinks were evaluated by a panel of experts in cola taste. Drinks made according to these comparative examples were judged as failing to provide a taste extremely close to that of a regular or full-calorie cola drink control, i.e., the drinks exhibited "diet taste".

COMPARATIVE EXAMPLES 2A-2C

Cola drinks were prepared in the same manner as in Example 2, except insofar as erythritol (2A), D-tagatose (2B), and both erythritol and D-tagatose (2C) were omitted, respectively. Drinks were evaluated by a panel of experts in cola taste. Drinks made according to these comparative examples were judged as failing to provide a taste extremely close to that of a regular or full-calorie cola drink control, i.e., the drinks exhibited "diet taste".

COMPARATIVE EXAMPLES 3A-3C

Cola drinks were prepared in the same manner as in Example 3, except insofar as erythritol (3A), D-tagatose (3B), and both erythritol and D-tagatose (3C) were omitted, respectively. Drinks were evaluated by a panel of experts in cola taste. Drinks made according to these comparative examples were judged as failing to provide a taste extremely close to that of a regular or full-calorie cola drink control, i.e., the drinks exhibited "diet taste".

EXAMPLE 16

To a gallon of unsweetened Diet Mountain Dew® base, erythritol (2.5% by weight of finished drink) and D-tagatose (0.9% by weight of finished drink) were added, and the solution was stirred until complete dissolution occurred. Aspartame (400 ppm per finished drink) was then added, and again the solution was stirred until complete dissolution. The syrup thus prepared was placed into a frozen carbonated beverage machine (Cornelius, V3, Wisconsin) in a 1 plus 5 throw (1 part syrup with 5 parts carbonated water). The resulting FCB has good carbon dioxide overrun, smooth, creamy mouthfeel and great taste. In addition, the syrup can be successively run through the FCB machine to consistently achieve a high quality FCB.

EXAMPLE 17

To a gallon of unsweetened Diet Mountain Dew(® base, erythritol (2.5% by weight of finished drink) and D-tagatose (0.9% by weight of finished drink) were added, and the solution was stirred until complete dissolution occurred. Acesulfame-K (60 ppm per finished drink) and sucralose (60 ppm per finished drink) were then added, and again the solution was stirred until complete dissolution. The syrup thus prepared was placed into a frozen carbonated beverage machine (Cornelius, V3, Wisconsin) in a 1 plus 5 throw (1 part syrup with 5 parts carbonated water). The resulting FCB has good carbon dioxide overrun, smooth, creamy mouthfeel and great taste. In addition, the syrup can be successively run through the FCB machine to consistently achieve a high quality FCB.

COMPARATIVE EXAMPLE 4

To a gallon of unsweetened Diet Mountain Dew(& base, erythritol (3.4% by weight of finished drink) was added, and the solution was stirred until complete dissolution occurred. Aspartame (400 ppm per finished drink) was then added, and again the solution was stirred until complete dissolution. The syrup thus prepared was placed into a frozen carbonated beverage machine (Cornelius, V3, Wisconsin) in a 1 plus 5 throw (1 part syrup with 5 parts carbonated water). The resulting FCB has good carbon dioxide overrun, mouthfeel and taste. However, a good quality FCB is not consistently achieved upon successive run through of the syrup thus prepared; after a second or third run through, the nozzle chamber freezes and/or other problems arise which prevent FCB from being dispensed from the FCB machine.

EXAMPLE 18

A frozen carbonated beverage was prepared in the same manner as in Example 17 except insofar as 2.0% fructose based on finished beverage weight was also included in the FCB. Drinks made according to this example were judged as providing a taste extremely close to that of a regular or full-calore FCB conrol.

Other variations and modifications of this invention will be obvious to those skilled in this art. This invention is not to be limited except as set forth in the following claims.

What is claimed is:

1. A diet frozen carbonated beverage comprising:
   (a) at least one non-nutritive sweetener,
   (b) erythritol in an amount of about 0.1% to about 3.5% based on finished beverage weight and
   (c) D-tagatose in an amount of about 0.1% to about 1.0% based on finished beverage weight.

2. The diet frozen carbonated beverage according to claim 1, wherein the erythritol is present in an amount of about 0.2% to about 2.5% based on finished beverage weight and wherein the D-tagatose is present in an amount of about 0.2% to about 0.9% based on finished beverage weight.

3. The diet frozen carbonated beverage according to claim 2, wherein the D-tagatose is present in an amount of about 0.3% to about 0.6% based on finished beverage weight.

4. The diet frozen carbonated beverage according to claim 1, wherein the at least one non-nutritive sweetener is a blend of non-nutritive sweetener comprising acesulfame-K and sucralose.

5. The diet frozen carbonated beverage according to claim 1, wherein the diet frozen carbonated beverage is a diet cola frozen carbonated beverage or a diet lemon-lime frozen carbonated beverage.

6. The diet frozen carbonated beverage according to claim 1, further comprising (d) at least one nutritive sweetener.

7. A method of making a diet frozen carbonated beverage comprising the steps of:
   (1) combining (a) at least one non-nutritive sweetener, (b) erythritol in an amount of 0.1% to about 3.5% based on finished beverage weight and (c) D-tagatose in an amount of about 0.1% to about 1.0% based on finished beverage weight in a diet frozen carbonated beverage syrup;
   (2) loading the diet frozen carbonated beverage syrup into a dispensing machine; and
   (3) dispensing the diet frozen carbonated beverage.

8. The diet frozen carbonated beverage according to claim 1, wherein the diet frozen carbonated beverage can be run through a frozen carbonated beverage machine at least three times.

9. The diet frozen carbonated beverage according to claim 1 wherein the erythritol is present in an amount of about 2.5% to about 3.5% based on finished beverage weight and wherein the D-tagatose is present in an amount of about 0.6% to about 1.0% based on finished beverage weight.

10. The diet frozen carbonated beverage according to claim 9 wherein the D-tagatose is present in an amount of about 0.8% to about 1.0%.

11. The diet frozen carbonated beverage according to claim 1 wherein the beverage contains a bulk solute consisting essentially of erythritol, D-tagatose and optionally a nutritive sweetener.

12. The diet frozen carbonated beverage according to claim 11 wherein the bulk solute consists essentially of erythritol and D-tagatose.

13. The diet frozen carbonated beverage according to claim 12 wherein the beverage is a zero-calorie beverage.

14. The diet frozen carbonated beverage according to claim 11, wherein the erythritol is present in an amount of about 0.1% to about 3.5% based on finished beverage weight and wherein the D-tagatose is present in an amount of about 0.1% to about 1.0% based on finished beverage weight.

15. The diet frozen carbonated beverage according to claim 14 wherein the erythritol is present in an amount of about 2.5% to about 3.5% based on finished beverage weight and wherein the D-tagatose is present in an amount of about 0.6% to about 1.0% based on finished beverage weight.

16. The diet frozen carbonated beverage according to claim 15 wherein the D-tagatose is present in an amount of about 0.8% to about 1.0%.

17. The diet frozen carbonated beverage according to claim 14, wherein the diet frozen carbonated beverage is a diet cola frozen carbonated beverage or a diet lemon-lime frozen carbonated beverage.

18. The method of making a diet frozen carbonated beverage of claim 7 wherein the beverage syrup contains a bulk solute consisting essentially of erythritol, D-tagatose and optionally a nutritive sweetener.

19. The method of making a diet frozen carbonated beverage of claim 18 wherein the bulk solute consists essentially of erythritol and D-tagatose.

20. The method of making a frozen carbonated beverage according to claim 7 wherein the erythritol is combined in an amount of about 2.5% to about 3.5% based on finished beverage weight and wherein the D-tagatose is combined in an amount of about 0.8% to about 1.0% based on finished beverage weight.

* * * * *